July 16, 1929.　　　G. H. GREENHALGH　　　1,721,250
FILTER
Filed Nov. 27, 1923　　　4 Sheets-Sheet 1

Inventor
George H. Greenhalgh
By his Attorneys
Moses, Hammond & Nite

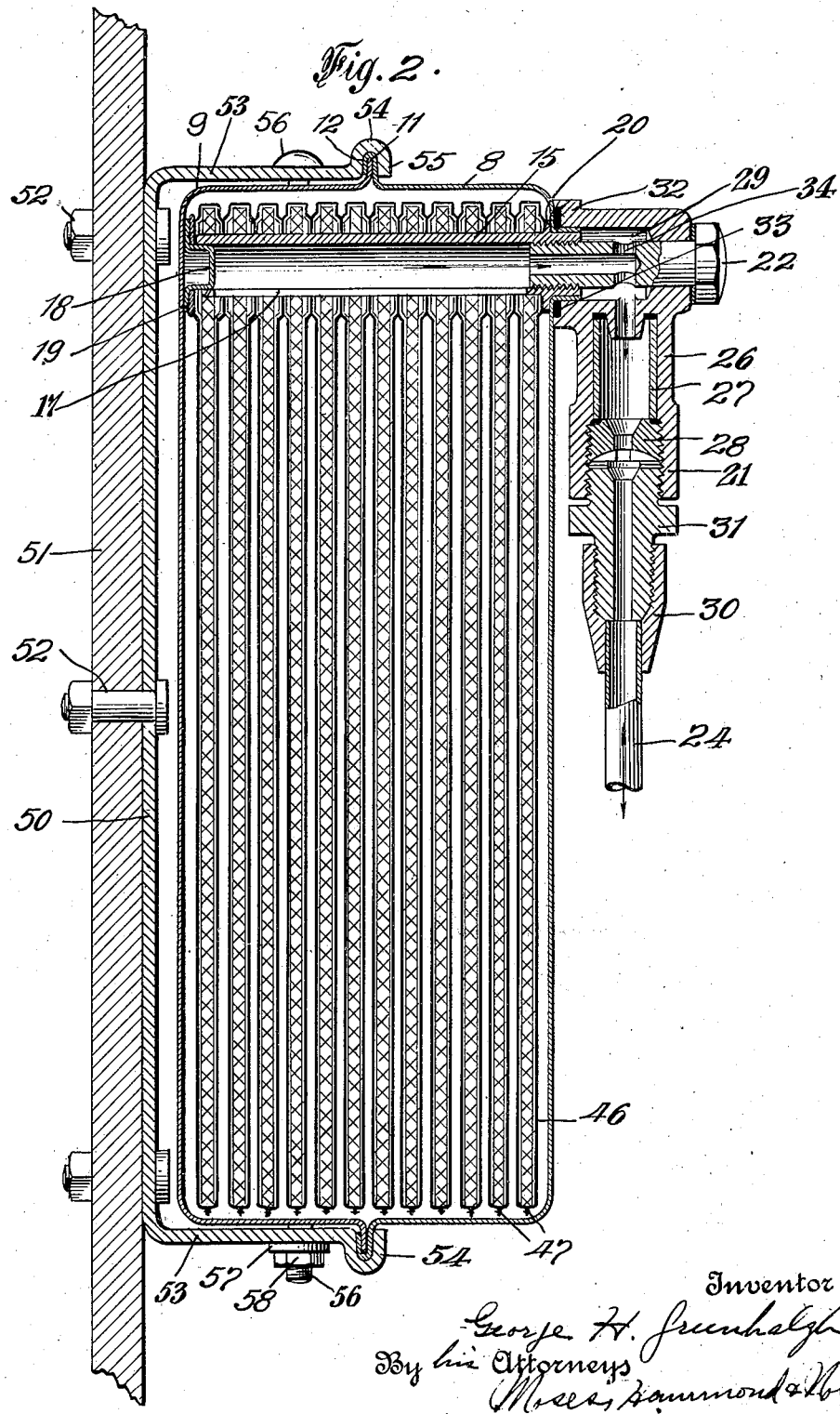

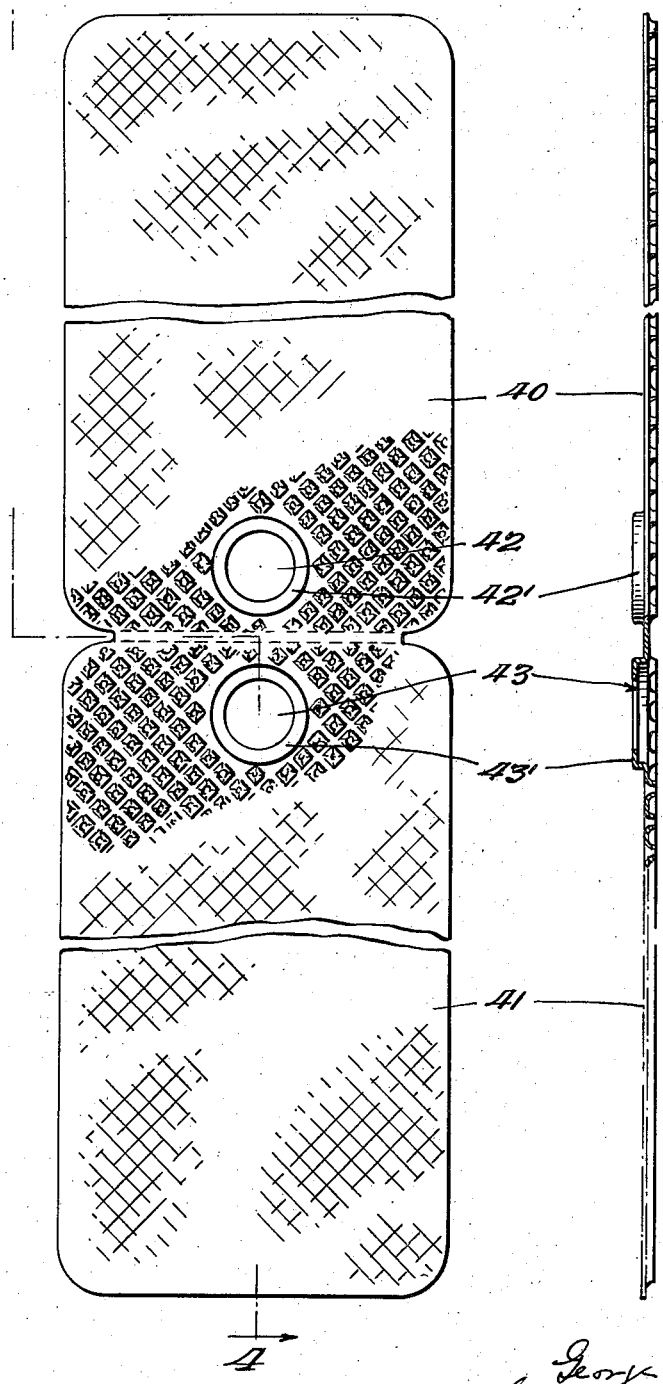
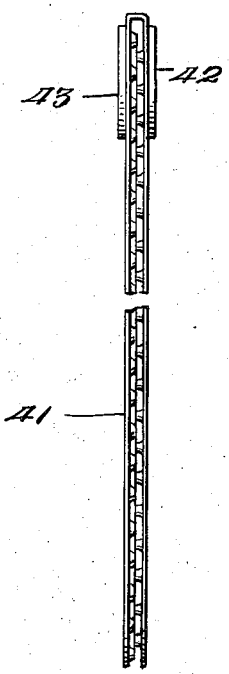

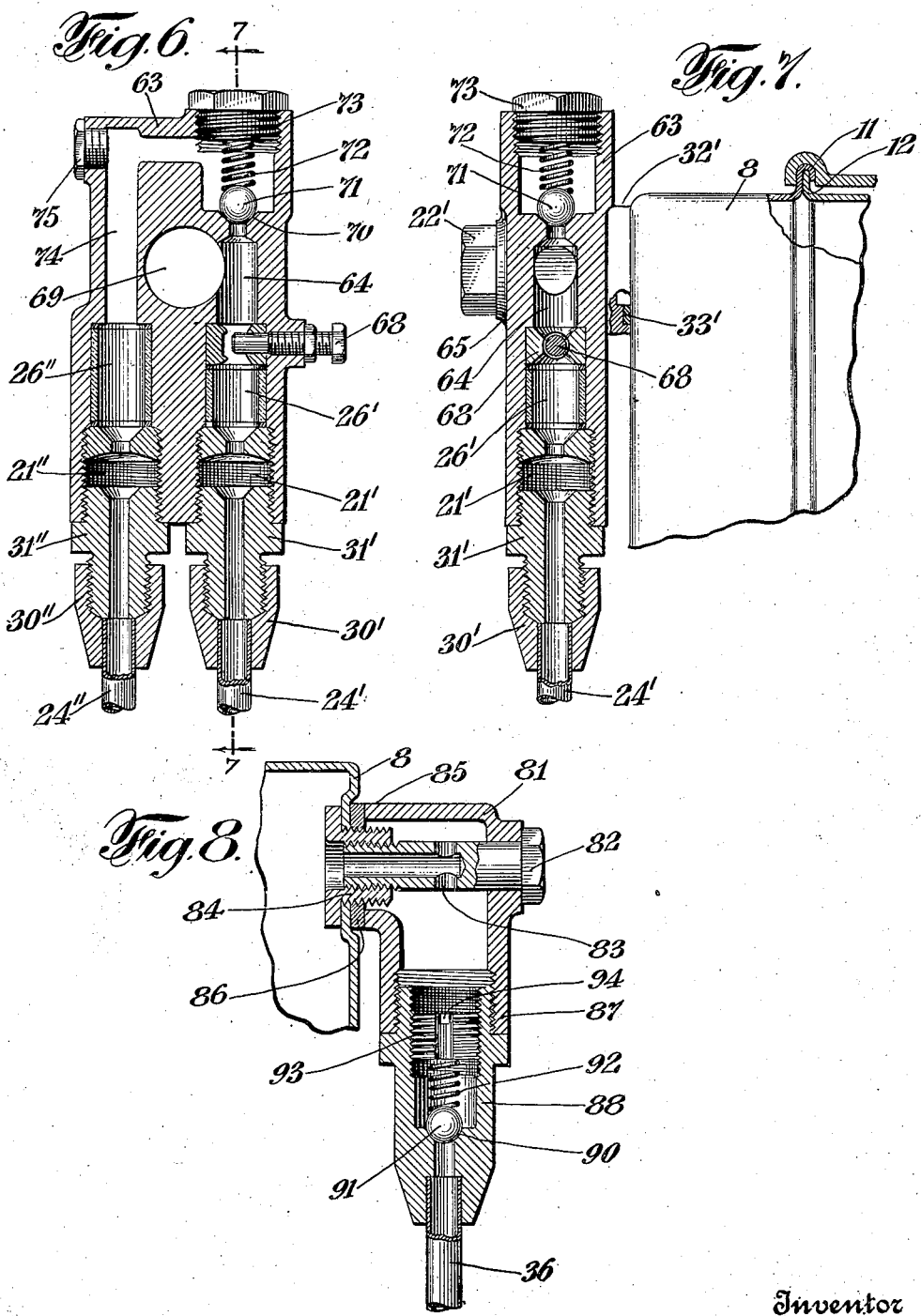

Patented July 16, 1929.

1,721,250

UNITED STATES PATENT OFFICE.

GEORGE H. GREENHALGH, OF NEWARK, NEW JERSEY, ASSIGNOR TO ERNEST J. SWEETLAND, OF HAZLETON, PENNSYLVANIA.

FILTER.

Application filed November 27, 1923. Serial No. 677,202.

This invention relates to filters and particularly to filters adapted to be used for removing deleterious matter from oil or other liquids, as for example from lubricants in the lubricating systems of internal combustion engines or other devices, such as machine tools, etc., using circulating lubricating systems, or in fuel oil burners where foreign matter in the oil is detrimental to the operation of the jets or nozzles, or in any other devices or systems where it is desired to purify oil or other liquid by the removal of deleterious matter.

The general object of the invention is to provide a new and improved filter which will have a very large filtering capacity in relation to the size or bulk of the filter as a whole; will be compact in form and cheap to manufacture; and can be readily inserted in and removed from a lubricating system or other system in connection with which it may be employed. One of the particular advantages of the invention resides in the fact that by it a filter is provided which is so cheap to manufacture that it will be practical to throw the filter away instead of cleaning it after it has become clogged.

Another object of my invention is to provide cheap and simple means whereby to effect efficient filtration by providing a drainage space between the filtering elements which is not diminished with increase in pressure on the filter elements and which gives a constant maximum outlet for the filtered oil or other liquids, irrespective of pressure, thereby avoiding the defect found in previous filters resulting from their tendency to block the passage of filtered liquid when the filter elements are under pressure. I have found that my improved filter has approximately five times the filtering capacity per unit of filtering area as compared with previous filters using wire screen as the filter supporting means, and that my filter may be constructed at approximately one-fourth of the cost of such previous filters. And I believe this increased efficiency is largely due to the avoidance of obstruction in the path of the filtered liquid out of the filter elements.

Other objects and advantages of my invention will be understood from the following description, taken in connection with the accompanying drawings.

Fig. 1 is a front elevation, partly in section, showing one form of my filter mounted on its support, and connected to the pipes of a lubricating system or the like;

Fig. 2 is a sectional side elevation of the same on the line 2—2 of Fig. 1;

Fig. 3 is a plan view of one form of filter element embodying my invention before it is bent into the form in which it is used;

Fig. 4 is an edge elevation of the same, partly in section on the line 4—4 of Fig. 3;

Fig. 5 is an edge elevation of the same filter element after it has been folded into the form in which it is used in the filter;

Fig. 6 is a vertical section of a preferred form of drainage coupling for use in place of the drainage coupling shown in Figs. 1 and 2 where it is desired to divide the stream of oil or other liquid after it leaves the filter:

Fig. 7 is a vertical section of the same on the line 7—7 of Fig. 6; and

Fig. 8 is a vertical section of a preferred form of supply pipe coupling.

Like parts are referred to throughout the drawings by the same reference characters.

Figure 1:
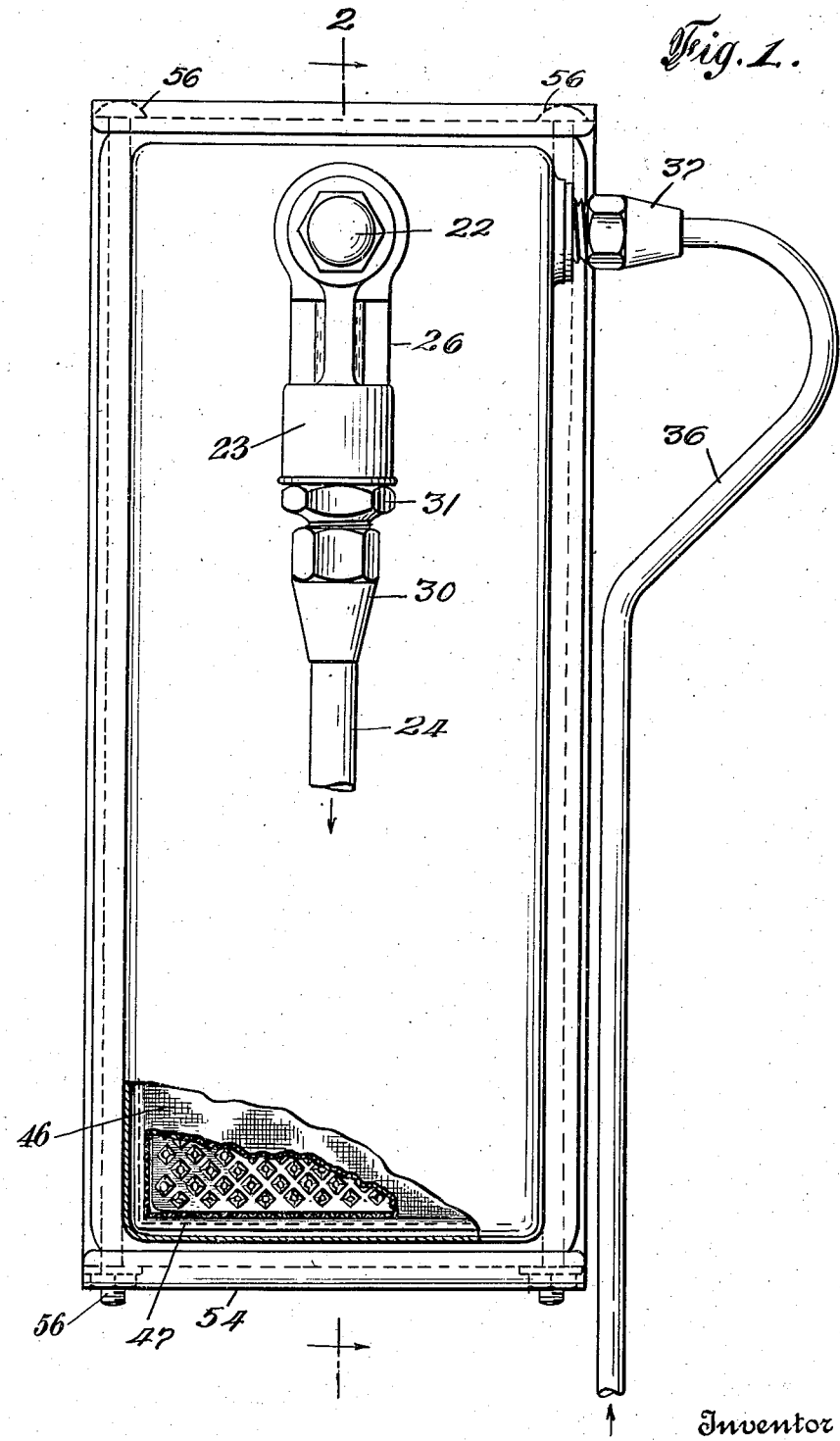

In the embodiment of my invention illustrated in the drawings, I have shown a filter, the casing of which is composed of two interlocking casing members 8 and 9, the adjacent edges of which are secured to one another by outwardly projecting flanges 11 and 12, the flange 11 being bent over flange 12 to clamp the two casing members together and making a liquid tight joint between them. I prefer to clamp the two casing members permanently together, though, of course, they may be removably secured together so long as the liquid tight joint is formed between them. The filter casing formed by the parts 8 and 9 is provided with inlet and outlet openings, the said openings being preferably formed in the front and at one side of the portion 8. Arranged within the casing are a plurality of filter leaves, the form of which will be hereinafter described, mounted preferably upon a drainage tube 15 which passes through said leaves and is in communication with the interior of said leaves through slot or slots 17 extending throughout that portion of the tube which is covered by the filter leaves. The drainage tube 15 is preferably closed at its inner end by a stamping 18 which fits snugly into the end of the drainage tube 15, as shown in Fig. 2, its purpose being to seal the inner end of the drainage tube 15 and to keep the filter leaves in place on the tube during assembly. A gasket 19 may be interposed between the end of the drainage tube and the flange of the stamping 18 if desired. Near its outer end, the drainage tube 15 is preferably provided with a flange 20 which engages the inside of the casing member 8 around the opening provided therein through which the drainage tube 15 projects.

Various methods may be employed for connecting the discharge pipe 24 to the drainage tube 15. The drawings illustrate one coupling device which has the advantage of being simple to construct, easy to connect and disconnect, and always providing a liquid-tight joint. As shown in Fig. 2, the inside of the projecting end of the drainage tube 15 is preferably threaded to receive a hollow bolt 22 by means of which the discharge coupling 23, leading to the discharge pipe 24, is attached to the filter casing. The discharge coupling 23 comprises preferably an upper horizontal thimble portion 29, an intermediate sight-glass portion 26, and a lower threaded portion 21, all of which portions are in communication. The flange 32 of the upper thimble portion 29 is adapted to surround the opening in the casing member 8 through which the drainage tube 15 projects. The flange is preferably provided with a recess adapted to receive a packing ring or gasket 33. The bolt 22 is hollow at its threaded end and is cross drilled as at 34 to provide communication between the interior of the drainage tube 15 and the interior of the thimble portion 29 of the coupling 23, no matter what the position of the bolt 22 may be when it is screwed in to hold the discharge coupling tightly against the casing 8. By this construction the flanges 20 and 32 may be brought into tight engagement with the filter casing 8 by tightly screwing the hollow bolt 22, thereby effecting a liquid-tight joint between the flange 20 and the casing 8 and between the casing 8 and the flange 32 of the discharge coupling.

In the center portion 26 of the discharge coupling is mounted a glass tube 27 through which the flow of filtered liquid may be observed, the glass tube being held in place by means of a perforated plug 28 screwed into the lower threaded portion 21 of the discharge coupling. This sight glass is of particular importance in connection with my renewable filter as it not only shows whether the liquid is flowing through at a proper rate, but it also indicates when the collection of sediment in the filter has so far impaired its efficiency as to necessitate replacement by a new filter in order to keep the system functioning properly.

The discharge pipe 24 is shown attached to the discharge coupling 23 by means of the threaded collar 30 and the coupling 31.

A modified form of drainage coupling is shown in Figs. 6 and 7 which is particularly useful where it is desired to pass the lubricant or other liquid from the filter to some other device, such, for example, as a purifying device, in limited quantity, the balance of the filtrate being returned to the system. In systems for purifying crank case oil of internal combustion engines particularly, it is desirable to distill a portion of the filtered oil in order to remove the non-lubricating liquids such as gasoline, kerosene, water and the like, which find their way into the body of oil in the crank case or elsewhere. Such liquids may be removed by distillation. The still works best upon filtered oil and upon a uniform and fairly continuous stream of the same. The discharge coupling shown in Figs. 6 and 7 provides means for dividing the stream of filtered oil, one stream being fairly uniform and continuous, and the other containing the balance of the filtered oil. Referring to Figs. 6 and 7, the modified discharge coupling 63 there shown consists of a body having a central transverse opening 69, the inner or filter end of which is provided with a flange 32′ adapted to surround the opening in the casing member 8 through which the drainage tube 15 projects (see Fig. 2). The flange 32′ corresponds to the flange 32 of the drainage coupling 23, shown in Fig. 2, and is preferably provided with a recess adapted to receive a packing ring or gasket 33′. At the outer end of the transverse opening 69 is a shoulder 65, against which the head of the hollow bolt 22′ is adapted to press when that hollow bolt (like the hollow bolt 22 in Fig. 2) is screwed home into the drainage tube 15. Thus the discharge coupling 63 is interchangeable with the discharge coupling 23 in so far as its connection with the filter is concerned.

The hollow bolt 22′ is cross drilled, so that there is communication between the interior of the drainage tube 15, the interior of the hollow bolt 22′, and the transverse opening 69, whatever may be the position of rotation of the hollow bolt 22′.

The transverse opening 69 communicates with a vertical passage 64 within the discharge coupling 63. At the lower end of this vertical passage 64 is a sight glass chamber 26′ and a coupling chamber 21′, provided with internal threads for engagement with a coupling member 31′ and threaded collar 30′, making a liquid-tight coupling with the discharge pipe 24′. Between the vertical passage 64 and the sight glass chamber 26′, a valve 68 may be provided to regulate the flow of the lubricant to the discharge pipe 24′.

The upper end of the passage 64 communicates with an ordinary spring loaded valve mechanism controlling the flow of liquid through the second discharge passage. This spring loaded valve comprises a valve seat 70, a ball 71, a spring 72 normally depressing the ball, and a screw plug 73 for regulating the pressure on the spring and ball. The passage from the valve is by pipe 74 to a second sight glass 26″ and coupling chamber 21″. A second coupling member 31″ and collar 30″ make liquid-tight connection between the chamber 21″ and the second discharge pipe 24″.

It will be understood that the sight glass or glasses may be inserted at any other convenient point in the filtered oil pipe, as for example, by carrying that pipe to the instrument board, but I prefer the structure as shown on account of its simplicity and compactness. It is is particularly important to have the sight glass in the outlet pipe of the filter when the filter is used in a system in which the filtered oil or a part of it is subsequently heated for the removal of liquid impurities of lower boiling points than the lubricant because the efficiency of such distillation is diminished if the lubricant or other liquid to be purified is allowed to pass to the distillator before the removal of dirt and other solid or suspended impurities. The sight glass provides convenient means for observing the condition of the liquid passing from the filter.

The inlet pipe 36 may be secured to the filter casing in any well known liquid-tight manner, as for example, by an ordinary coupling device 37, as shown in Fig. 1.

However, I prefer to employ a supply pipe coupling such as that shown in Fig. 8. This preferred form of supply pipe coupling consists of a thimble portion 81 corresponding to the thimble portion 26 of the discharge coupling 23, and is similarly secured to the casing member 8 of the filter casing by a hollow bolt 82 drilled and cross-drilled as at 83, the inner end of the bolt 82 being threaded to engage a threaded sleeve 84 secured in the casing 8 so that when the hollow bolt 82 is screwed down tight, it forces the rim 85 of the thimble portion 81 into tight engagement with the nut or gasket 86, thus providing a liquid-tight joint between the thimble portion 81 and the filter casing member 8. This construction allows free passage for the oil or other liquid from the interior of the the thimble portion 81 to the interior of the filter through the cross-drilled holes 83 and hollow portion of the bolt 82, whatever may be the position of the bolt 82. The thimble portion 81 is provided with a lateral opening as at 87 for communication with the outlet opening of a valve member 88, which communicates in turn with the supply pipe 36, by which the oil or other liquid is fed to the filter. The valve member 88 is preferably in the form of an adjustable spring loaded valve consisting of a valve seat 90, a ball 91 normally resting in the valve seat, a spring 92 pressing the ball into the valve seat, and a hollow plug 93 for adjusting the pressure on the spring 92. The plug is preferably provided with a cross cut 94 in its upper surface so that it may be conveniently adjusted from above when the valve member 88 has been unscrewed from the lateral opening 87 of the supply coupling.

The form of supply pipe and coupling shown in Fig. 8 is easily applied to the filter by simply screwing up on the hollow bolt 82, and may be removed from the filter by the reverse process, as in the case of the discharge pipe coupling shown in Figs. 1 and 2. The valve member 88 may be employed or not, as desired, but it is particularly advantageous where the filter is employed in a system in which the filter is located in a branch line from the pressure line which supplies oil or other liquid to the working parts, as for example, the bearings of an internal combustion engine, in which case it is desirable to maintain a certain pressure upon the working parts. The back pressure of the filter itself is not uniform. It tends to increase as the filter is used and, in case of a break in the filter, it may have no back pressure whatever, so that without some other preventive means in the circuit, all of the oil or other liquid would pass through the filter, thus robbing the bearings. By placing an adjustable valve member, such as the part 88, in the supply pipe to the filter, I am able to control the pressure to the bearings or other working parts so that the filter will receive only the excess of lubricant or other liquid which is not desired to be supplied to the bearings or working parts of the system. At the same time I provide means to prevent the dirty liquid collected in the filter from siphoning back into the engine or working parts, or into the oil receptacle of the system when operation of the system is stopped.

The filter casing may be of any appropriate or convenient form. In systems employing substantial pressure in the filter, I may construct the casing of cheap material and yet avoid distention of the filter by corrugating the side walls of the casing or by providing a permanent holder shaped to fit around the filter casing when in use, whereby the filter casing may be made of material that is no stronger than is necessary for assembly and transportation, the filter walls being supported by the sides of the permanent holder when the filter is installed in the system and subjected to pressure.

The filter leaves for use in this filter may be variously constructed. The drawings (particularly Figs. 3, 4 and 5) show one advantageous form in which is combined a very large effective filtering surface with good drainage of the filtered liquid, the same being shown in a form that is cheap to manufacture and effective in use. In these drawings it will be seen that each filter leaf comprises a sheet of metal, such as tin or iron or the like, stamped full of holes so that on one side it presents a smooth thickly perforated surface and on the other a surface dotted with sharp projections or burrs like a nutmeg grater. These projections are irregular in height but have a certain rough uniformity, so that when the filter sheets are folded together as shown in Fig. 5, they serve as spacers for the filter leaves which positively prevent collapse of the opposing filter elements upon each other, when subjected to pressure, and so always permit the filtrate to flow through, between and around them without substantial interference with the drainage. By preventing the filtering surfaces from collapsing on each other by means of spacers which still leave ample drainage space within the filter leaves, I take full advantage of the effective filtering area of the filtering material and am able to provide a free flowing but efficient filter of small bulk capable of delivering a large amount of filtrate.

Fig. 2 clearly shows the large drainage space between the folded portions of the filter leaves, despite the fact that the filter cloth is represented as lying close to the filter leaves—the position it assumes when under pressure.

The filter sheet shown in Fig. 3 contains complementary portions 40, 41, having flanged openings 42 and 43 adapted to be in line with one another when the portions 40 and 41 are folded into the condition shown in Fig. 5. It will be noted that when the holes 42 and 43 are punched in the adjacent ends of the portions 40, 41, an outstanding rim or flange is pressed out in each as shown at 42' and 43'. These flanges serve as spacing members and hold the filter leaves in spaced relation to each other as shown in Fig. 2, and thus the need of spacing washers is eliminated, though they may be used if desired. Before the filter leaves are assembled on the drainage tube 15 their outer smooth but reticulated surfaces are covered with filter cloth 46 which is preferably folded over the top of each filter leaf and is sewed or otherwise secured around the bottom and side edges thereof as indicated at 47 in Figs. 1 and 2. The filter cloth 46 is perforated in line with the holes 42 and 43 and to conform to the size of said holes, and said cloth may thus serve as gaskets between the flanges 42' and 43', which surround the holes 42 and 43 in the various drainage members, thereby preventing leakage between the filter leaves and into the drainage tube 15 after the filter leaves have been assembled upon said tube and compressed together by the sealing together of the casing parts 8 and 9 as hereinbefore explained.

I preferably use canton flannel or other fine fiber material as a filter cloth, the nap side of the material being outside—that is, presented to the dirty liquid. The filter cloth may or may not be treated with kiezelguhr or the like as desired.

Inasmuch as the filter which has been described is intended to be removed and discarded after it has become so filled with impurities that it ceases to function properly, the filter casing must be mounted in a manner which permits its ready insertion and removal. A desirable form of filter supporting means is shown in Figs. 1 and 2. A sheet metal bracket 50, secured to any suitable support 51 by means of bolts 52, is provided at its upper and lower ends with outwardly extending portions 53 having crimped outer edges 54 adapted to cooperate with the flanged union between the portions 8 and 9 of the casing. To ensure that the bracket will firmly hold the filter casing after it has been inserted, bolts 56 extending through the top and bottom portions of the bracket are provided. As shown, the lower threaded ends of the bolts 56 are supplied with washers 57 and nuts 58, which, when tightened, effectively prevent the filter from sliding out from between the portions 53.

It will be obvious from the foregoing that when it is desired to remove a filter and insert a new one it is merely necessary to unscrew the hollow bolts at the discharge and supply couplings and one bolt 56 of the filter supporting means. The filter casing 8, 9 will then slide out sidewise from between the crimped edges 54 of the bracket and a new filter casing may be inserted and be made ready for operation by simply replacing these three bolts. The matter requires no particular skill or effort and may be done in a few minutes with a pair of pliers or a wrench and without the dirt and muss incident to the old method of crank case drain.

I have shown the casing members 8, 9 as thin metal stampings held in liquid-tight engagement by the crimping of the flange of one portion over the flange of the other after the filter elements have been placed inside. This construction is so cheap and efficient that I find it more economical to use my filter until it has become filled with dirt, and then replace it with a new one, than to use the heavier old fashioned type of filter and clean it from time to time. Moreover the filtration through a new filter is better than that through a cleaned filter.

While I have described certain constructions in which my invention may be embodied, it is to be understood that I intend in the appended claims to cover all modified constructions and equivalents which come within the scope thereof.

What I claim as new and desire to secure by Letters Patent is:—

1. In combination, a filter having a casing composed of a plurality of similar counterpart sections having their rims attached to one another by outwardly projecting cooperating flanges, and supporting means for said filter adapted to cooperate with the flanged portions of said casing.

2. A filter comprising a casing built up of a plurality of similar counterpart sections having their edges folded together to form a liquid-tight joint, a bracket for holding said filter in position which includes members to receive and clamp the filter casing at the joint.

3. A filter having a thin metal casing, means for admitting liquid within the casing under pressure, a holder for the casing adapted to support the end walls of the casing and prevent distention of the same by internal pressure when the casing is within the holder, and means in contact with said side walls to secure said holder to said end walls and to prevent distention of the side walls.

4. A filter comprising a plurality of filter elements assembled on a hollow shaft and enclosed in a liquid-tight container, a sight delivery fixture removably secured to the end of said shaft and held in position by a hollow screw engaging in the end of said shaft.

5. In apparatus of the character described, a filter casing, a plurality of filter plates in said casing, each filter plate comprising a pair of parallel members, perforations in the said members, and separated spacers adjacent the perforations within the filter plate to prevent collapse of the said members under pressure, but without substantially interfering with the drainage of filtered liquid within the filter plate, a shaft supported in said casing, and means integral with said filter plates for supporting them in spaced relation on said shaft.

6. In apparatus of the character described, a filter casing, a plurality of filter plates in said casing, a central drainage conduit, in contact with and draining said filter plates, an exterior outlet pipe, a hollow member on the end thereof adjacent said casing, and a hollow screw within said hollow member adapted to contact with said drainage member to provide communication between said drainage conduit and said exterior outlet pipe, said hollow screw and hollow member forming a detachable coupling.

7. In apparatus of the character described, a casing, inlet and outlet openings for the casing, a tube within the casing communicating with the outlet opening, a plurality of filter elements mounted on said tube and communicating with the interior thereof, external inlet and outlet supply pipes to be connected to said apparatus, a hollow member attached to the end of said outlet pipe, adjustable hollow screw means within said hollow member screwed into the tube to hold said hollow member in liquid tight contact with said tube to provide fluid communication between said tube and said member, a valve in said hollow member to prevent return of fluid through said outlet pipe, and means to attach said inlet pipe to said opening.

8. In apparatus of the character described, a casing, inlet and outlet openings for the casing, a tube within the casing communicating with the outlet opening, a plurality of filter elements mounted on said tube and communicating with the interior thereof, external inlet and outlet supply pipes to be connected to said apparatus, a quick detachable pipe coupling for making liquid-tight connection between the outlet pipe and discharge tube, said coupling comprising a hollow member, adjustable means at one end thereof for holding the said member in liquid tight engagement with the casing, and for providing communication between said outlet pipe and discharge tube, and means at the other end of said member for communicating with said pipe.

9. A filter comprising a casing built up of a plurality of similar counterpart sections having their edges folded together to form a liquid-tight joint, one of said sections being provided with an outlet opening, a threaded portion adjacent the opening, a discharge coupling adapted to engage the casing adjacent the opening, and hollow bolts to hold the said coupling in liquid-tight engagement with said casing and to provide communication between the interior of said casing and said coupling.

10. In a pressure filter of the class described, a metallic casing, inlet and outlet conduits for the casing, a supporting and drainage tube within the casing and in communication with the outlet opening, a plurality of filter plates mounted on said drainage tube and in fluid communication therewith, said filter elements having ample drainage space for the filtered liquid, projections on said plates to maintain said space constant under pressure, and a liquid-tight crimped joint in said casing to withstand the pressure therein.

In testimony whereof, I have signed my name to this specification.

GEORGE H. GREENHALGH.